(12) United States Patent
Schädlich

(10) Patent No.: US 10,486,732 B2
(45) Date of Patent: Nov. 26, 2019

(54) STEERING COLUMN FOR A MOTOR VEHICLE, AND ENERGY ABSORPTION DEVICE

(71) Applicants: THYSSENKRUPP PRESTA AG, Eschen (LI); thyssenkrupp AG, Essen (DE)

(72) Inventor: André Schädlich, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 102 days.

(21) Appl. No.: 15/573,976

(22) PCT Filed: May 4, 2016

(86) PCT No.: PCT/EP2016/059972
§ 371 (c)(1),
(2) Date: Nov. 14, 2017

(87) PCT Pub. No.: WO2016/184684
PCT Pub. Date: Nov. 24, 2016

(65) Prior Publication Data
US 2018/0290681 A1    Oct. 11, 2018

(30) Foreign Application Priority Data
May 18, 2015    (DE) .................. 10 2015 209 060

(51) Int. Cl.
*B62D 1/19* (2006.01)
*F16F 7/12* (2006.01)
(52) U.S. Cl.
CPC .............. *B62D 1/195* (2013.01); *F16F 7/123* (2013.01)
(58) Field of Classification Search
CPC .......... B62D 1/192; B62D 1/195; F16F 7/123
See application file for complete search history.

(56) References Cited

U.S. PATENT DOCUMENTS

| 6,419,269 B1 * | 7/2002 | Manwaring ............ B62D 1/184 280/775 |
| 6,655,716 B2 * | 12/2003 | Riefe ..................... B62D 1/195 188/374 |

(Continued)

FOREIGN PATENT DOCUMENTS

| CN | 101274638 A | 10/2008 |
| CN | 103052556 A | 4/2013 |

(Continued)

OTHER PUBLICATIONS

English Translation of International Search Report issued in PCT/EP2015/059972, dated Jul. 8, 2016 (dated Jul. 18, 2016).
English abstract of DE10313470B.

*Primary Examiner* — Laura Freedman
(74) *Attorney, Agent, or Firm* — thyssenkrupp North America, Inc.

(57) ABSTRACT

A steering column may include a sleeve unit in which a steering spindle rotatably mounted about a longitudinal axis, which sleeve unit is accommodated in a supporting unit so as to be displaceable in a longitudinal direction. An energy absorption device may be fitted between the supporting unit and the sleeve unit. The energy absorption device may include first and second bending elements that each comprise an elongate input limb positioned parallel to the longitudinal direction and connected at a free end to the supporting unit or the sleeve unit, and merges at another end into a bend to which a fixed limb is connected. The fixed limb may be connected to the other of the supporting unit or the sleeve unit. The second bending element may be formed in a mirror-inverted manner relative to the first bending element and may be positioned mirror-symmetrically adjacent to the first bending element.

10 Claims, 5 Drawing Sheets

(56) References Cited

U.S. PATENT DOCUMENTS

| | | | | |
|---|---|---|---|---|
| 8,573,372 B2 * | 11/2013 | Humfeldt | ................ | B60R 22/28 |
| | | | | 188/371 |
| 8,678,437 B2 * | 3/2014 | Narita | .................... | B62D 1/184 |
| | | | | 188/371 |
| 2006/0273568 A1 * | 12/2006 | Manwaring | ............ | B62D 1/195 |
| | | | | 280/777 |
| 2018/0050719 A1 * | 2/2018 | Agbor | .................... | B62D 1/195 |

FOREIGN PATENT DOCUMENTS

| CN | 103347768 | A | | 10/2013 | | |
|---|---|---|---|---|---|---|
| DE | 10313470 | B | | 9/2004 | | |
| DE | 102008034807 | B | | 10/2009 | | |
| DE | 102012101494 | | | 5/2013 | | |
| DE | 102012111890 | | | 12/2013 | | |
| DE | 102013101045 | | | 5/2014 | | |
| DE | 102013104958 | | | 7/2014 | | |
| DE | 102014016510 | | | 2/2015 | | |
| DE | 102014104354 | | | 4/2015 | | |
| DE | 102014104350 | | | 5/2015 | | |
| EP | 1630098 | A | | 3/2006 | | |
| FR | 2787409 | A1 | * | 6/2000 | ............ | B62D 1/192 |
| JP | 2004009803 | A | * | 1/2004 | | |
| JP | 2005193906 | A | * | 7/2005 | | |
| KR | 20070045774 | A | | 5/2007 | | |

* cited by examiner

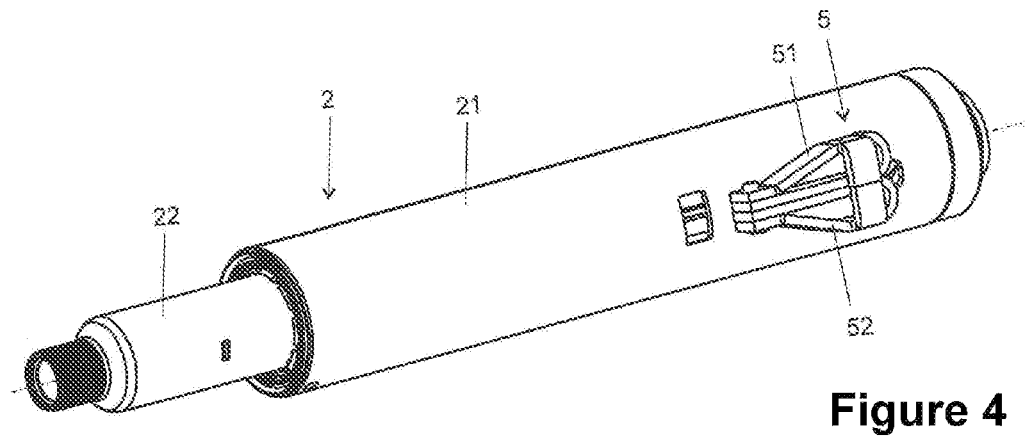
Figure 4
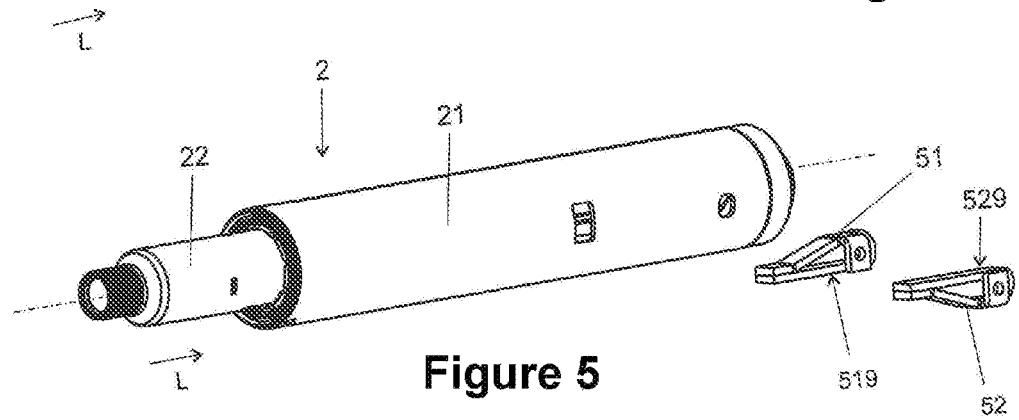
Figure 5
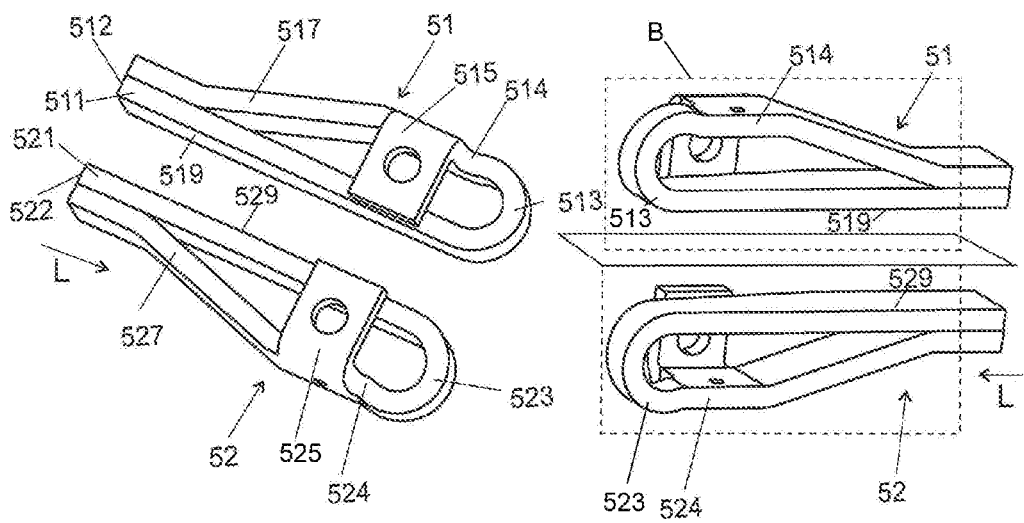
Figure 6
Figure 7

STEERING COLUMN FOR A MOTOR VEHICLE, AND ENERGY ABSORPTION DEVICE

CROSS REFERENCE TO RELATED APPLICATIONS

This application is a U.S. National Stage Entry of International Patent Application Serial Number PCT/EP2016/059972, filed May 4, 2016, which claims priority to German Patent Application No. DE 10 2015 209 060.4, filed May 18, 2015, the entire contents of both of which are incorporated herein by reference.

FIELD

The present disclosure generally relates to steering columns, including steering columns for motor vehicles with improved energy absorption devices.

BACKGROUND

The steering torque introduced into the steering wheel by the driver is transmitted via the steering spindle to the steering gear, by which track rods are moved and, as a result, a steering angle of the steerable wheels of a motor vehicle is brought about. The rotatable mounting of the steering spindle takes place in a sleeve unit which can be designed as a guide box or steering column tube, depending on the structural form. The sleeve unit is fitted to the vehicle body via a supporting unit, for example a bracket unit.

In order to improve the occupant's safety in the event of a vehicle collision or, in other terms, a crash, a crash device or a crash system is provided in a steering column. A crash device is realized by the sleeve unit being pushable forwards in the longitudinal direction relative to the body-mounted supporting unit when the body of the driver impacts against the steering wheel during a head-on collision at high speed, with a large force being exerted on the steering wheel, said force exceeding a limit value which occurs only in the event of a crash. In order to ensure controlled braking here of the body impacting against the steering wheel, an energy absorption device is coupled between the sleeve unit and the supporting unit, which are customarily fixed to each other by the clamping device of a position adjustment device during normal operation, but are pushed together relative to each other in the event of a crash. Said energy absorption device converts the introduced kinetic energy into plastic deformation of an energy absorption element, in the design of the type in question by bending an elongate bending element, for example a bending wire or bending strip.

A bending wire or bending strip, as is described, for example, in the case of a steering column of the type in question in DE 10 2008 034 807 B3, has a substantially U-shaped basic shape with a first limb—referred to as the input limb—which merges via a bend of 180° into a second limb—called the fixed limb. The input limb extends in the longitudinal direction and can be connected at its free end to the sleeve unit. The fixed limb can be fixed to the supporting unit with a fastening portion which is likewise located in the end region of the limb. Alternatively, it is possible for the input limb to be connected to the supporting unit and for the fixed limb to be connected to the sleeve unit.

During normal operation, supporting unit and sleeve unit are connected fixedly to each other via the bending element and are thereby positioned relative to each other in the longitudinal direction. In the event of a crash, a large force acts in the longitudinal direction between sleeve unit and supporting unit, as a result of which the bending element deforms and kinetic energy is absorbed. The deformation takes place specifically in that the input limb, which is moved by the sleeve unit, is displaced in the longitudinal direction parallel to the stationary fixed limb, and therefore the position of the bend with respect to the free end of the input limb migrates or rolls with a bending radius remaining substantially constant, that is to say, the input limb is bent within the plane provided by the U-shaped basic shape in the bending direction of the bend and peters out behind the bend into the fixed limb. It is advantageous here that the quantity of energy which is converted or absorbed as the bend progresses can be defined relatively precisely by the bent material cross section of the bending element.

During the bending of the input limb, transverse forces act between the limbs of the bending element transversely with respect to the longitudinal axis and have to be supported so that the radius of the bend, progressing in the event of a crash, remains substantially constant, and the limbs are not deflected laterally, and the bending radius of the bend is not expanded in an undefined manner. For this purpose, it is known from the abovementioned DE 10 2008 034 807 B3 to arrange the bending element between lateral boundary walls extending in the longitudinal direction. As a result, lateral deflection during the deformation of the limbs in the event of a crash is effectively prevented and therefore a uniformly defined force profile during the deformation of the bending element is ensured.

However, it is problematic that, in the event of a crash, at least one of the limbs slides with its outer side facing away from the bend along the boundary wall in the longitudinal direction. The frictional forces occurring in the process can interfere with the uniform force profile during the energy absorption in the event of a crash. To counteract this, it has indeed been proposed to provide at least the outer side of the bending element with a friction-reducing coating. However, this requires the use of special coating material and in particular an additional processing step, as a result of which the manufacturing outlay and the costs are increased.

Thus a need exists for a steering column with an improved energy absorption device, and an energy absorption device that permits simplified production and reliable functioning in the event of a crash.

BRIEF DESCRIPTION OF THE FIGURES

FIG. 4 is a schematic perspective view of another example adjustment unit of a steering column.

FIG. 5 is a schematic partially-exploded perspective view of the adjustment unit of the steering column of FIG. 3.

FIG. 6 is a schematic perspective view of an example energy absorption device of the steering column of FIGS. 1-3 and 5 with pulled-apart bending elements.

FIG. 7 is a perspective view of the energy absorption device of FIG. 6.

DETAILED DESCRIPTION

Figure 1:
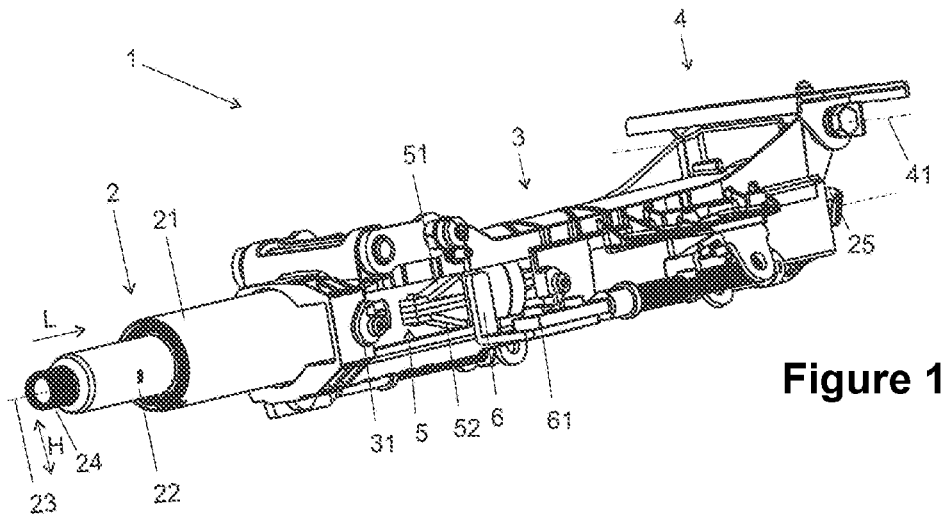
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steering column for a motor vehicle may comprise a supporting unit that is connectable to a body of the vehicle, and a sleeve unit in which a steering spindle is mounted so as to be rotatable about its longitudinal axis and that is accommodated in the supporting unit so as to be displaceable in a longitudinal direction parallel to the longitudinal axis. An energy absorption device may be fitted between the supporting unit and the sleeve unit. The energy absorption device may comprise at least one first bending element that comprises an elongate input limb that is arranged parallel to the longitudinal direction and comprises a free end and another end that merges into a bend to which a fixed limb is connected. The free end may be connected to the supporting unit and the fixed limb may be connected to the sleeve unit. Alternatively, the free end may be connected to the sleeve unit and the fixed limb may be connected to the supporting unit. The present disclosure also concerns an energy absorption device for a steering column of a motor vehicle.

Steering torque introduced into a steering wheel by a driver is transmitted via the steering spindle to a steering gear, by which track rods are moved and, as a result, a steering angle of steerable wheels of the motor vehicle is brought about. The rotatable mounting of the steering spindle takes place in a sleeve unit that can be designed as a guide box or a steering column tube, depending on the structural form. The sleeve unit is fitted to the vehicle body via a supporting unit such as, for example, a bracket unit.

To overcome the problems with the prior art discussed in the background, a second bending element may be formed in a mirror-inverted manner with respect to a first bending element and may be arranged mirror-symmetrically adjacent to the first bending element.

According to the invention, bending elements are in each case arranged in pairs in each case mirror-symmetrically. A pair is in each case formed here by two bending elements which are arranged lying opposite each other on both sides of a mirror plane which is formed by a radial plane containing the longitudinal axis, i.e. the longitudinal axis lies in the mirror plane. The bend of the bending elements—which is preferably approximately 180° as in the case of the known bending elements—lies here in a bending plane which extends parallel to the longitudinal axis perpendicular to the mirror plane. Consequently, the bending elements each lie opposite each other with the outer sides of their input limbs or fixed limbs which face away from the bending direction of the bend.

A particular advantage of the configuration according to the invention is that the outer surfaces on the outer sides of the limbs, which are displaced in a translational manner in the longitudinal direction relative to the supporting unit or the sleeve unit during the crash, can be arranged in pairs. Said surfaces which are paired in a mirror-inverted manner move identically in the longitudinal direction; only a rolling movement in the region of the transition into the bend occurs rather than any relative movement between them. Consequently, the sliding friction which is disadvantageous in the prior art does not occur.

A further advantage of the arrangement symmetrically in pairs according to the invention is that the bending elements can be at least partially mutually supported in order to absorb the transverse forces acting during the deformation in the event of a crash, as a result of which a simpler and more compact construction can be realized. With regard to lateral boundary walls which can optionally be provided on the supporting unit for limiting the deflection of the limbs in the transverse direction, only rolling similarly occurs, rather than any relative movement in the longitudinal direction. As a result, high functional reliability can be ensured, wherein friction-reducing coatings or the like can be dispensed with. The manufacturing outlay is reduced as a result.

In a preferred embodiment of the invention, the outer sides of the input limbs, which outer sides face away from the bend, lie parallel against each other. The input limbs lie against each other here in the mirror plane. By means of their length, they provide the path, within which the braking for energy absorption in the event of a crash takes place. As described above, in the event of a crash the bend is moved beyond the input limb counter to the longitudinal direction until the input-side free end of the input limb reaches the bend. During the bending, a transverse force is exerted which moves the input limb transversely with respect to the longitudinal axis in the direction of the outer side of the input limb, which direction faces away from, i.e. is opposed to, the bending direction of the bend. Owing to the fact that the outer sides lie opposite each other, the input limbs are supported against each other in pairs in the transverse direction in the mirror plane, and therefore no additional support has to take place by means of boundary walls or the like. In the event of a crash, the two input limbs lying against each other move uniformly in the longitudinal direction and are bent away inwards on reaching the bend, and therefore the outer sides are lifted axially symmetrically off each other there. This separation of the two outer sides includes exclusively a relative movement counter to the surface normal of the outer sides and is not obstructed by sliding friction in the longitudinal direction. The input limb passes the bend and comes out at the fixed limb in the direction of the fastening portion. The outer side of the fixed limb is moved uniformly here with the supporting unit to which the fastening portion of the fixed limb is connected, i.e. sliding friction likewise does not occur in the longitudinal direction between oppositely directed surfaces of fixed limb and supporting unit.

The effect achieved by the arrangement according to the invention of the bending elements in pairs is that the bending elements are mutually supported by their input limbs within the energy absorption device and are fixed in the transverse direction, and the energy absorption device only comes into contact with the supporting unit via fixed limbs. As a result, no sliding movements occur between the bending elements and those surfaces of supporting and sleeve unit which are displaced counter to one another in the longitudinal direction in the event of a crash.

The described arrangement with the input limbs lying against each other has the advantage that a deflection in the transverse direction of the input limbs, which is subjected to a compression loading in the longitudinal direction in the event of a crash, is effectively prevented. However, it is alternatively possible, with the manner of operation basically being the same, for the bending elements to lie mirror-symmetrically against each other by their fixed limbs. In this embodiment, the input limbs can be supported in the transverse direction on boundary walls which, like the fastening of the input limbs, are formed on the steering column tube.

It is basically conceivable and possible to connect the input limbs as described to the sleeve unit and accordingly to connect the fixed limbs to the supporting unit. Alternatively, with the manner of operation basically being the same the fitting can also be reversed such that the input limbs are connected to the supporting unit and the fixed limbs to the sleeve unit.

In a development of the invention, the input limbs can be connected to each other via tearing-off elements. As already described above, in the event of a crash, the input limbs which initially lie against each other by their outer sides in the mirror plane are lifted off each other counter to the normal direction of the outer sides. The tearing-off elements are arranged as predetermined breaking elements between the input limbs and hold together the outer sides of the input limbs with a defined load-bearing capacity. If, in the event of a crash, a force acts between the outer sides of the input limbs counter to the normal direction, the force pushing the outer sides apart, the tearing-off elements tear off when a defined force is exceeded. By means of a defined specification of the force for tearing off the tearing-off elements, it is possible to specifically increase the force required for separating the input limbs. As a result, the energy absorption characteristics can be adapted within wide limits. The practical realization of the tearing-off elements can basically take place by any type of connection between the input limbs, which connection is detached when a certain loading is exceeded, for example by means of rivets or other connecting elements which are guided by the input limbs, or by means of welding points or welding tracks between the surfaces lying against each other, or by means of adhesive connections. Alternatively, the input limbs can also comprise interconnecting clamps or casings.

The fixed limbs can comprise fastening elements for connecting the fixed limbs to a supporting unit or sleeve unit. The fastening elements serve for connecting the fixed limb to the steering column. They can be designed, for example, as fastening tabs which extend at an angle from a fixed limb perpendicularly to the mirror plane. They can be directed towards the input limb or towards the adjacent bending element, with fastening openings which run parallel to the mirror plane and perpendicularly to the longitudinal axis. Fastening tabs of this type can be attached to the supporting unit with screws, rivets or other connecting elements. Connections of this type are loadable, reliable and can be realized with little outlay on manufacturing.

In an embodiment of the invention, the fastening portions of the adjacent bending elements are connected to each other perpendicularly to the mirror plane. The connection has the effect that the fixed limbs of the bending elements of a pair of bending elements according to the invention are fixed relative to each other transversely with respect to the input of force. As a result, the fixed limbs cannot be deflected by the transverse forces occurring during the bending of the limbs in the event of a crash, and therefore a controlled deformation is ensured, and therefore the function of boundary elements or boundary walls is at least partially provided, with the connection of the fastening portions being possible with relatively little outlay. The connection can preferably take place by means of interlocking elements; alternatively or additionally, welding or adhesive bonding can take place.

An advantageous possibility for connecting the fastening portions to each other and optionally to the supporting unit or sleeve unit consists in that the fastening portions are connected to a bridge element. The bridge element is connectable to a supporting unit or sleeve unit. The bridge element can be connectable to the supporting unit or the sleeve unit and can serve for connecting the fixed limbs to each other. The connection of the bridge element to the fastening portions can take place by means of an interlocking connection, for example by means of rivets, screws or the like, or by means of an integrally bonded connection by means of welding or adhesive bonding. The bridge element can be formed, for example, from steel, aluminium, other metals or plastics materials.

In an advantageous development, the fixed limb extends to the free end of the input limb and is connected to the latter via a breakaway element. In this embodiment of the invention, the fixed limb is not only connected to the supporting unit but also at a free end to the input limb. The bending element thereby obtains the form of a closed loop, wherein the free ends of input limb and fixed limb preferably point in the same direction, and therefore a type of droplet shape is formed. If, in the event of a crash, the free end of the input limb is loaded in the longitudinal direction, a shearing force occurs between the free ends of input limb and fixed limb. Said shearing force is initially absorbed by the breakaway element which, when a force limit value is reached, breaks and releases the mutual movement of input limb and fixed limb. As a result, a limit value at which the actual deformation of the bending element starts can be predetermined in a defined manner. The breakaway element can be provided, for example, by a shearing bolt, rivet or stud which is guided through congruent passage openings in the region of the free ends of input limb and fixed limb and fastened. By means of the dimensions, in particular the diameter, and the material, for example steel, aluminium, other metals or plastics materials, the triggering force of the breakaway element can be predetermined within wide limits with little outlay and the energy absorption characteristics of the energy absorption device according to the invention can be correspondingly set.

It is advantageous that the energy absorption device is arranged between boundary elements which extend parallel to the longitudinal axis adjacent to the fixed limbs. The boundary elements can be configured, for example, as boundary walls which extend parallel to the longitudinal axis, are oriented parallel to the mirror surface and are fitted on the supporting unit or sleeve unit. The bending elements can be supported by their outer surfaces, which face outwards with respect to the mirror plane, on the boundary walls. For example, the fixed limbs can be supported by their outer sides on boundary walls which are formed on the supporting unit. As a result, in the event of a crash, deflection of the fixed limb in the transverse direction is prevented, and therefore the deformation of the bending element is controlled better and the energy absorption characteristics can be predetermined particularly precisely.

The bending elements can preferably be designed as punched and/or bent parts. The manufacturing from steel or other materials can take place economically and precisely in the form of a wire or strip bent part or punched part. In the configuration of said parts, a two-dimensional shape can preferably be selected, and therefore a bent part can be inserted mirror-symmetrically in an energy absorption device according to the invention by a simple 180° rotation about an axis of rotation lying in the plane of extent. In order to realize the invention, only one type of punched or bent parts therefore has to be produced, which reduces the outlay on manufacturing and the stockkeeping. Furthermore, it is ensured that the symmetrically used, otherwise identical bending elements have substantially identical deformation and therefore energy absorption properties, which is of benefit for the reliable functioning.

It can furthermore be advantageous for the bending elements to be coated with a coating. It is true, in the case of the invention, as explained, that no sliding movement occurs between the bending elements and supporting or sleeve unit, and therefore the reduction in the friction is not as relevant as in the prior art. However, it can be required in the individual case that no adhesion or the like occurs even after longstanding inactivity of the crash device, which can be particularly ensured by means of a coating. The coating here can be an adhesion-reducing or a galvanically separating coating.

It is furthermore conceivable and possible to arrange two or more energy absorption devices according to the invention at different positions between supporting unit and sleeve unit, for example on opposite sides of the sleeve unit, in order to permit an improved symmetrical introduction of energy. Energy absorption devices having different energy absorption characteristics can also be arranged in a steering column.

An energy absorption device for a steering column of a motor vehicle, for coupling between a supporting unit and a sleeve unit which is displaceable in the longitudinal direction thereto, comprising at least one bending element which has an elongate input limb which is arranged parallel to the longitudinal direction and is connected at its free end to the supporting unit or the sleeve unit is distinguished, according to the invention, in that a second bending element is formed in a mirror-inverted manner with respect to the first bending element and is arranged mirror-symmetrically adjacent to the first bending element. An energy absorption device of this type can furthermore comprise all of the features explained previously in conjunction with the steering column according to the invention.

It should be emphasized in particular that an energy absorption device according to the invention can be used on all structural forms of steering columns. For example, in the case of a steering column which is adjustable in the longitudinal direction and has an adjustment unit consisting of telescopic inner and outer steering column tubes, an energy absorption device according to the invention can be coupled between inner and outer steering column tube. It is likewise possible to use an energy absorption device between an adjustment device and a supporting or holding unit designed as a bracket unit. The same applies to steering columns which are adjustable in the vertical direction in addition to the longitudinal direction.

FIG. 1 shows a steering column 1 according to the invention schematically in a perspective view obliquely from the rear (with respect to the direction of travel of a motor vehicle which is not illustrated).

The steering column 1 has an adjustment unit 2, with a sleeve unit 21 which is designed as a steering column tube 21 and in which a steering spindle 22 is mounted so as to be rotatable about the longitudinal axis 23. (The designations steering column tube 21 and sleeve unit 21 are used synonymously below). At its rear end with respect to the direction of travel, the steering spindle has a fastening portion 24 for the fitting of a steering wheel (not illustrated).

For the designation of directional details, it is established by definition below that the steering spindle 22 and therefore the steering column tube 21 or the adjustment unit 2 extend from the steering-wheel-side end, where the fastening portion 24 is located, forwards in the longitudinal direction L parallel to the longitudinal axis 23 to the steering-wheel-remote or steering-gear-side end 25, which is indicated by the forwardly pointing arrow L.

The sleeve unit 21 is accommodated in a supporting unit 3—which, depending on the design of the steering column, is also referred to as a guide box or box-section swing arm—so as to be displaceable parallel to the longitudinal axis 23 in and counter to the longitudinal direction L, as a result of which, firstly, an adjustment of the length of the steering column 1 can be undertaken in order to adapt the steering wheel position and, secondly, energy absorption in the event of a crash can take place. By means of a clamping device 31 which is not explained in detail and is known per se in the prior art, the adjustment unit 2 can be fixed relative to the supporting unit 3 during normal operation.

The steering column 1 can be fastened to a body (not illustrated) of a motor vehicle with a bracket 4. At the bracket 4, the supporting unit 3 is mounted so as to be pivotable about an axis 41 lying perpendicularly to the longitudinal axis 23, as a result of which the steering wheel can be adjusted vertically in both vertical directions H.

Fitted between the sleeve unit 21 and the supporting unit 3 is an energy absorption device 5 which forms a connection in the longitudinal direction L.

In the event of a crash, a large force is exerted in the longitudinal direction L on the sleeve unit 21 via the steering spindle 22 due to the fact that the driver impacts with his body forwardly against the steering wheel. The acting force is transmitted from the sleeve unit 21 in the longitudinal direction L via the energy absorption device 5 to the supporting unit 3 which is fixedly connected to the body in this direction. The operating principle of the energy absorption device 5 is based on the fact that the introduced kinetic energy is converted into plastic deformation, as a result of which energy absorption and therefore controlled braking of the driver take place. A defined breakaway force can be set here.

Figure 2:
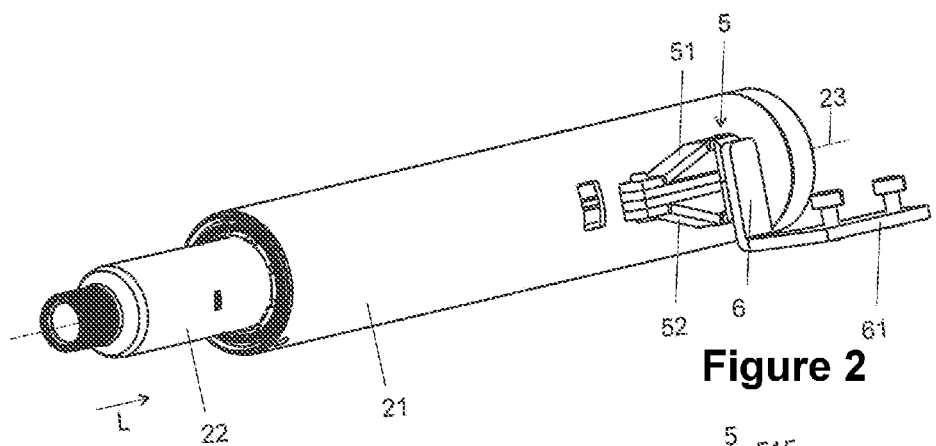
FIG. 2 is a schematic perspective view of an example adjustment unit of the steering column of FIG. 1.
Figure 3:
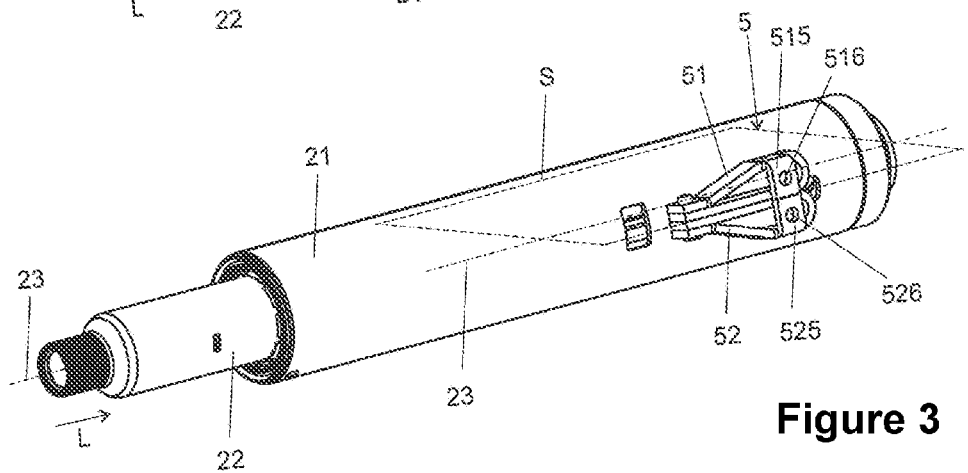
FIG. 3 is a schematic perspective view of the example adjustment unit of the steering column of FIG. 1.

FIGS. 2, 3 and 4 show the adjustment unit 2 in the same perspective as FIG. 1, wherein the supporting unit 3 has been omitted for better clarity.

The energy absorption device 5 has two bending elements 51 and 52 which, according to the invention, are designed in a mirror-inverted manner, specifically with respect to a mirror plane S, which is defined as the radial plane with respect to the longitudinal axis 23, i.e. the mirror plane S extends parallel to the longitudinal axis 23, wherein the longitudinal axis 23 lies in the mirror plane S. For clarification, the position of the mirror plane S is shown by dashed lines in FIG. 3.

Figure 8:
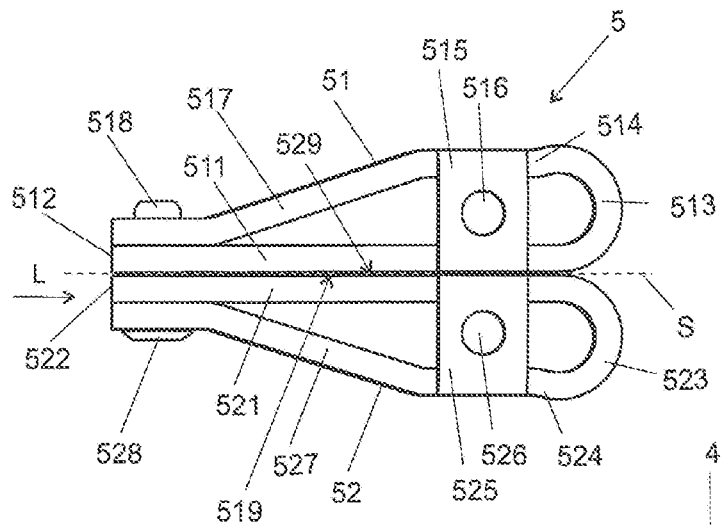
FIG. 8 is a top view of the energy absorption device of FIG. 6 in a radial direction with respect to a longitudinal axis.

The bending elements 51 and 52 comprise the identical functional elements in a mirror-inverted arrangement in each case, as can be seen with reference to the enlarged illustrations in FIGS. 6, 7 and 8, wherein FIG. 8 shows a view of the fully fitted energy absorption element 5 in the radial direction with respect to the longitudinal axis, and FIGS. 6 and 7 show perspective views in which the two bending elements 51 and 52 are pulled apart perpendicularly from the mirror plane S.

The bending elements 51 and 52 each have an elongate input limb 511, 521 which extends forwards in the longitudinal direction L from its free input-side end 512, 522. The input limb 511, 521 enters into a bend 513, 523 which is bent laterally in a manner directed away from the mirror plane S in the bending plane which is a plane parallel to the longitudinal axis 23 and perpendicular to the mirror plane S (the paper plane B in FIG. 7). The bend 513, 523, which preferably describes an arc of 180°, is adjoined by the fixed limb 514, 524 which extends counter to the longitudinal direction L and on which a fastening element 515, 525 is arranged. The fastening element 515, 525 can be designed as a tab which extends from the fixed limb 514, 524 in the transverse direction towards the mirror plane S until over the input limb 511, 521, wherein the fastening element 515, 525 is not connected to the input limb 511, 521 and can comprise a fastening opening 516, 526. Over the further course, the fixed limb 514, 524 extends with a connecting region 517, 527 as far as the free end 512, 522 of the input limb 511, 521. The fixed limb 514, 524 can be connected there to the input limb 511, 521 by a breakaway element 518, 528, for example by a rivet 518, 528, as illustrated in FIG. 7.

In the case of the energy absorption device 5 which is illustrated, the two bending elements 51 and 52 lie against the mirror plane S and therefore against each other with the outer sides 519 and 529 directed against each other. The mutual positional fixing of the bending elements 51 and 52 can take place by said outer sides 519 and 529 being welded or adhesively bonded to each other or being connected to each other by means of interlocking elements, or alternatively by a connection of the fastening elements 515 and 525 to each other, for example, as in the embodiment illustrated in FIG. 2, by means of a bridge element 6 which can be fixed, for example, in an interlocking manner in the fastening openings 516 and 526, for example with studs, rivets, bolts or the like. In a further alternative which is shown in FIG. 4, the fastening elements 515 and 525 themselves can be fixedly connected to each other, for example welded.

The input limbs 511, 521 are fixedly connected at their free end 512, 522 to the sleeve unit 21, for example by means of welding or an interlocking connection.

The fixed limbs 514, 524 are connected via the bridge element 6, on which further fastening elements 61 can be formed, to the supporting unit 3 which is stationary relative to the sleeve unit 21, i.e. the fixed limbs 514, 524 are forwardly supported on the supporting unit 3 counter to the force introduced in the longitudinal direction in the event of a crash.

Figure 9:
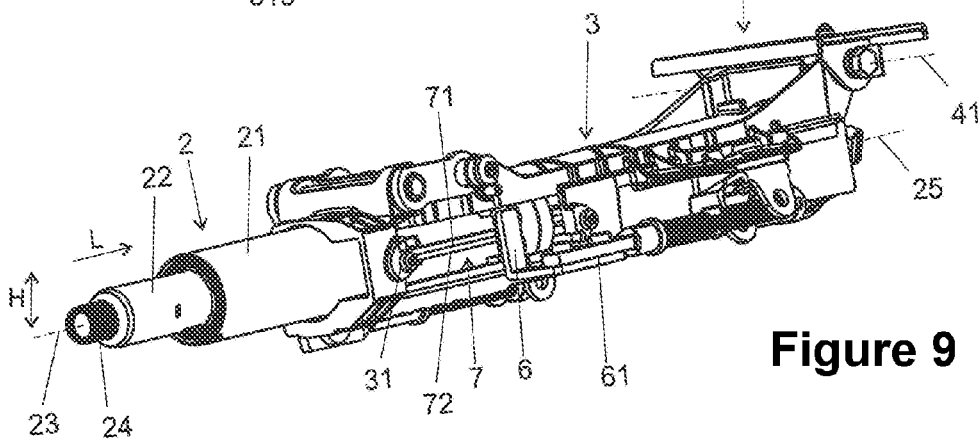
FIG. 9 is a schematic perspective view of another example steering column.
Figure 10:
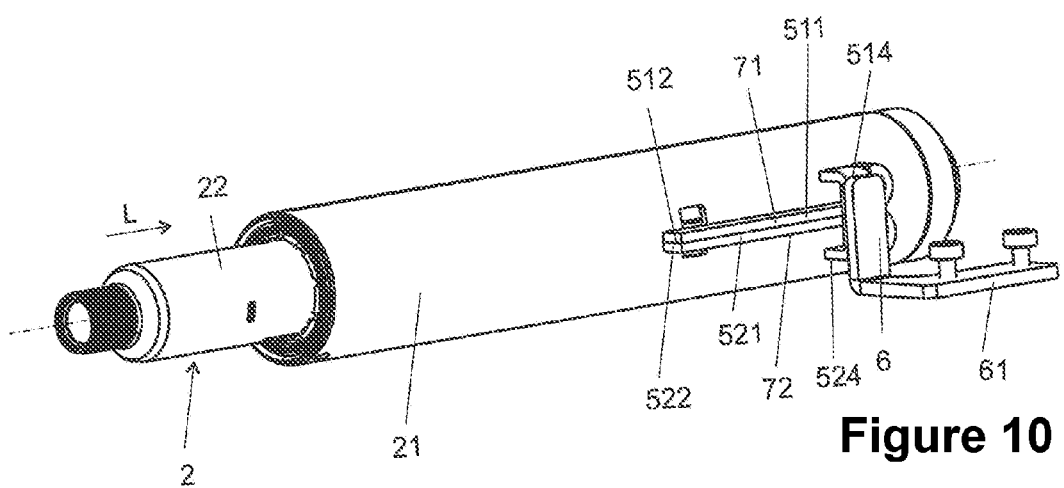
FIG. 10 is a schematic perspective view of an example adjustment unit of the steering column of FIG. 9.
Figure 11:
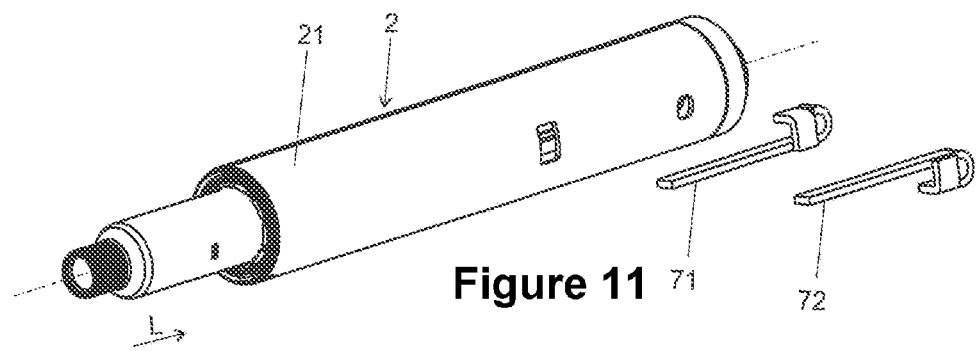
FIG. 11 is a schematic partially-exploded perspective view of the adjustment unit of FIG. 9.

FIGS. 9, 10 and 11 illustrate a second embodiment of a steering column, wherein the views correspond to those from FIGS. 1, 2 and 5. The substantial difference over the first embodiment consists in the configuration of the energy absorption device 7. The same reference signs as in the first embodiment are used here for identically acting functional elements of the steering column 1 and of the energy absorption device 7.

FIGS. 9, 10 and 11 differ from FIGS. 1, 2, and 5 merely in the energy absorption device 7, and therefore the description given above can be read identically on said steering column 1 and the adjustment unit 2.

Figure 12:
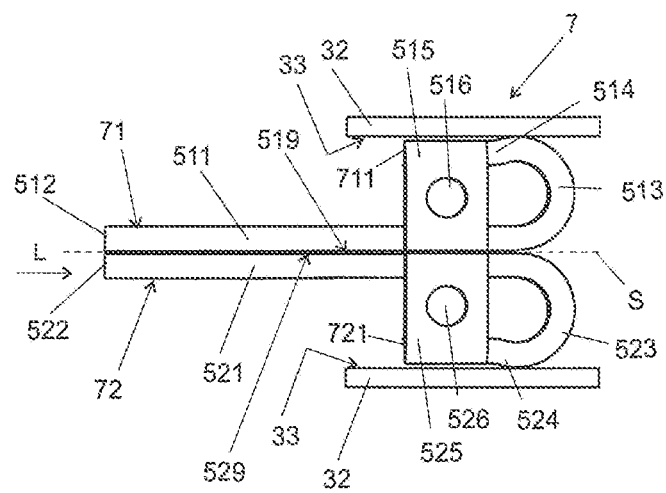
FIG. 12 is a top view of the energy absorption device according to FIGS. 9 to 11 in a radial direction with respect to a longitudinal axis.

The energy absorption device 7 comprises two mirror-symmetrically arranged bending elements 71 and 72 which are constructed in a mirror-inverted manner with respect to the mirror plane S, as can be clearly seen in FIG. 12. Said bending elements basically have the same functional regions as the bending elements 51 and 52 according to FIG. 8, which is clarified by the use of the same reference signs as in FIG. 8. However, in contrast to the first variant, there is no connecting region (reference signs 517, 527 in FIG. 8) between the fixed limbs 514, 524 and the free end 512, 522 of the input limb 511, 521. Consequently, a free end 711, 721 of the fixed limb 514, 524 is located behind the fastening element 515, 525, as seen from the bend 513, 523.

The operating principle of the invention that the input limbs 511, 521 are mutually supported in the mirror plane S in the event of a force introduced in the longitudinal direction L into the free end 512, 522 in the event of a crash, is likewise realized. During deformation, the bend 513, 523 moves forwards in the longitudinal direction L with the displacement of the input limbs 511, 512 with respect to the stationary supporting unit 3, i.e. each portion of the input limb 511, 521 is gradually bent as it passes the bend 513, 523, with deformation work being performed and kinetic energy being converted or absorbed. Different characteristic curves can be represented by changing cross sections. The deformation ends when the free end 511, 521 reaches the same height as the fastening element 515, 525 and/or the bend 513, 523. The length of the deceleration path in the event of a crash and therefore the energy absorption characteristics can be predetermined in this manner by means of the length of the input limb 511, 521.

Figure 13:
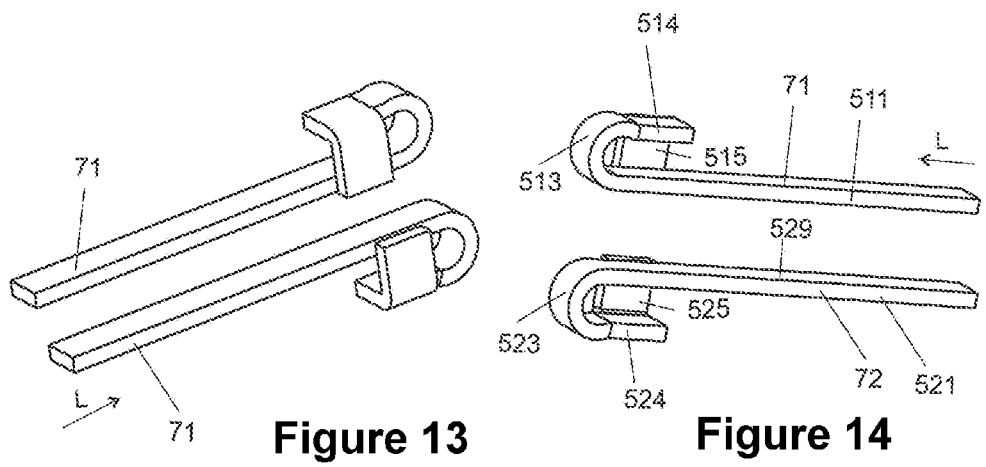
FIG. 13 is a perspective view of the energy absorption device according to FIG. 12.
Figure 14:
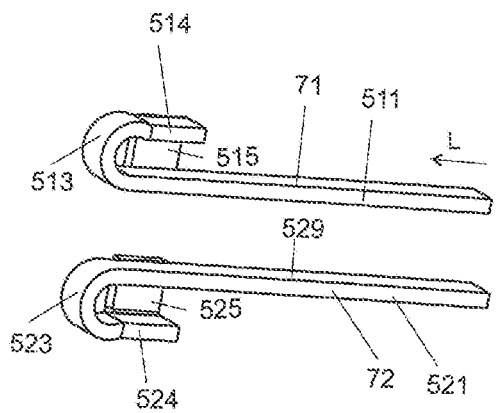
FIG. 14 is a schematic perspective view of the energy absorption device of the steering column according to FIGS. 9 to 11 with pulled-apart bending elements.

FIGS. 13 and 14 shows perspective views of the bending elements 71 and 72 which are presented in a manner pulled apart in the transverse direction with respect to the mirror plane S.

The fastening elements 515 and 525 can be designed as has been described above for the first embodiment.

Figure 15:
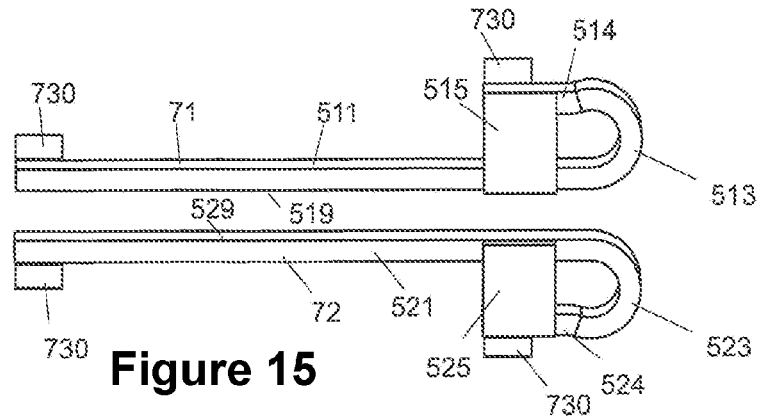
FIG. 15 is a perspective view of the energy absorption device according to FIG. 12.

A development is shown in FIG. 15 in which, in the region of the free end 512, 522 of the input limb 511, 521 and on the fixed limb 514, 524 in the region of the free end 711, 721 or of the fastening element 515, 525, connecting elements 730 are fitted on the bending elements 71, 72. At said connecting elements 730, the input limb 511, 512 can be fastened to the steering column tube 21, for example by welding.

Figure 16:
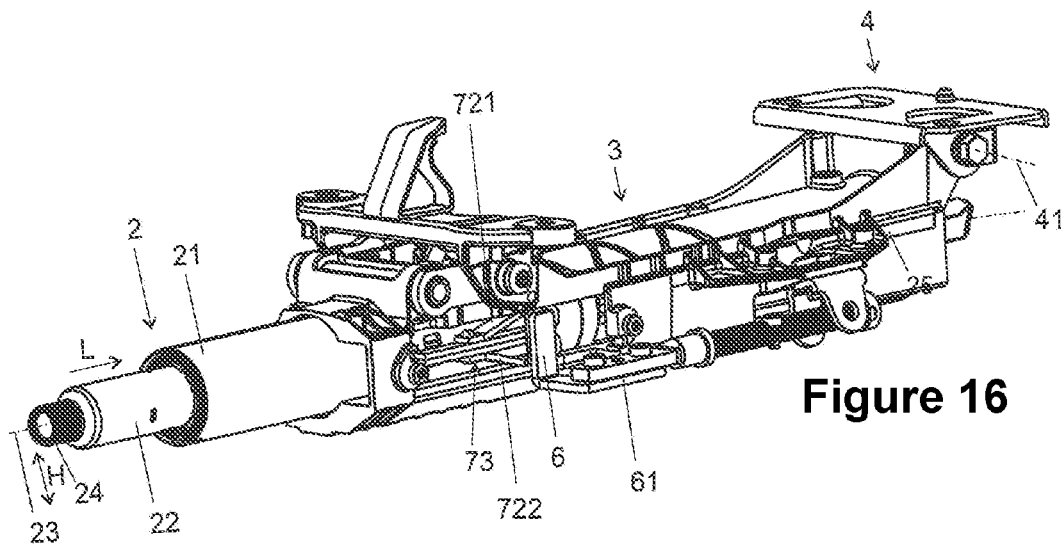
FIG. 16 is a schematic perspective view of still another example steering column.
Figure 17:
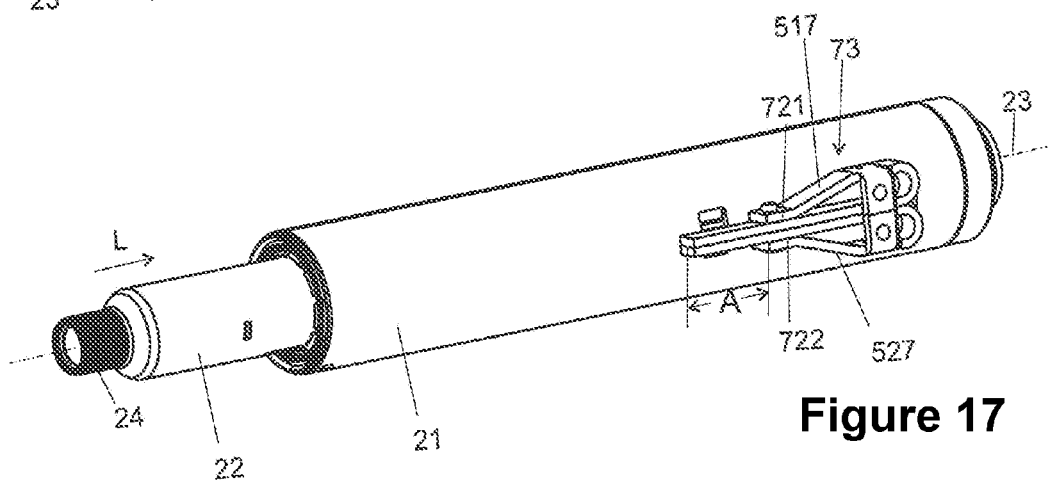
FIG. 17 is a view of an example adjustment unit of the steering column of FIG. 16.

FIGS. 16 and 17 illustrate a third variant of an energy absorption device 73 according to the invention. Said energy absorption device 73 is constructed similarly in respect of its function as explained above, wherein aspects of the first variant, namely the energy absorption device 5, and the second variant, namely the energy absorption device 7, are realized Like the first variant, the bending elements 721, 722 of the energy absorption device 73 comprise a connecting region 517, 527 which connects the fixed limb 514, 524 to the input limb 511, 521. However, the connection is not located in the end region but rather at a distance A from the free end 512, 522. This realizes an embodiment like the embodiment shown in FIGS. 6 to 8, which is adjoined within the distance A by a configuration as in the embodiment according to FIGS. 12 to 14. The specific advantages of the two embodiments can thereby be combined with one another.

It is furthermore conceivable and possible to arrange an energy absorption device 5, 7 or 73 between boundary elements 32, as illustrated by way of example in FIG. 12. The boundary elements 32 are arranged on the supporting unit 3 parallel to the longitudinal axis 23 and comprise boundary surfaces 33 which are directed counter to the mirror plane S and are parallel thereto. In the event of a crash, the fixed limb 514, 524 or the input limb 511, 512 which then runs through the bend 513, 523 can be supported against the boundary surface 33 transversely with respect to the longitudinal direction L, i.e. directed away from the mirror plane S. This avoids a deflection and an expansion of the bend 513, 523, as a result of which the energy absorption characteristics can be better controlled.

To the extent usable, all of the individual features of the invention can be combined with one another without departing from the scope of the invention.

LIST OF REFERENCE SIGNS

1 Steering column
2 Adjustment unit
21 Sleeve unit (steering column tube)
22 Steering spindle
23 Longitudinal axis
24 Fastening portion
25 End
3 Supporting unit (guide box)
31 Clamping device
32 Boundary element
33 Boundary surface
4 Bracket
41 Axis
5 Energy absorption device
51, 52 Bending element
511, 521 Input limb
512, 522 Free end
513, 523 Bend
514, 524 Fixed limb
515, 525 Fastening element
516, 526 Fastening opening
517, 527 Connecting region
518, 528 Breakaway element
519, 529 Outer side
6 Bridge element
61 Fastening element
7, 73 Energy absorption device
71, 72 Bending element
711, 721 Free end
721, 722 Bending element
730 Connecting element
L Longitudinal direction
H Vertical direction
S Mirror plane
A Distance

What is claimed is:

1. A steering column for a motor vehicle comprising:
a supporting unit configured to be connected to a body of the motor vehicle;
a sleeve unit in which a steering spindle is rotatably mounted about a longitudinal axis of the steering spindle, the sleeve unit being accommodated in the supporting unit so as to be displaceable relative to the supporting unit in a longitudinal direction parallel to the longitudinal axis of the steering spindle; and
an energy absorption device disposed between the supporting unit and the sleeve unit, the energy absorption device comprising first and second bending elements that each comprise an elongate input limb that is parallel to the longitudinal direction and a free end and another end that merges into a bend to which a fixed limb is connected, wherein either the free end is connected to the supporting unit and the fixed limb is connected to the sleeve unit, or the free end is connected to the sleeve unit and the fixed limb is connected to the supporting unit,
wherein the second bending element mirrors the first bending element and is disposed adjacent to the first bending element,
wherein the second bending element is formed in a mirror-inverted manner with respect to the first bending element and is positioned mirror-symmetrically adjacent to the first bending element, and
wherein outer sides of the elongate input limbs of the first and second bending elements face away from the bends and lie parallel against one another.

2. The steering column of claim 1 wherein the elongate input limbs of the first and second bending elements are connected to one another by way of tearing-off elements.

3. The steering column of claim 1 wherein the fixed limbs comprise fastening elements for connecting the fixed limbs to the supporting unit or the sleeve unit.

4. The steering column of claim 3 wherein the fastening elements of the first and second bending elements are connected to each other perpendicularly to a mirror plane extending between the first and second bending elements.

5. The steering column of claim 3 wherein the fastening elements are connected to a bridge element.

6. The steering column of claim 1 wherein the fixed limbs extend to the free ends of the elongate input limbs and are connected to the elongate input limbs via breakaway elements.

7. The steering column of claim 1 wherein the energy absorption device is disposed between boundary elements that extend parallel to the longitudinal axis adjacent to the fixed limbs.

8. The steering column of claim 1 wherein each of the first and second bending elements is configured from a bending wire or a bending strip.

9. The steering column of claim 1 wherein each of the first and second bending elements is configured from a punched part or a bent part.

10. The steering column of claim 1 wherein the first and second bending elements are coated with a coating.

* * * * *